United States Patent Office.

ALVAH H. SABIN, OF BURLINGTON, VERMONT, ASSIGNOR TO HIMSELF, GEORGE H. MORSE, WILLIAM A. CROMBIE, OTIS SHEPARD, EDWARD W. PECK, AND T. S. PECK, ALL OF SAME PLACE.

CONDENSED MILK.

SPECIFICATION forming part of Letters Patent No. 329,778, dated November 3, 1885.

Application filed February 19, 1885. Serial No. 156,424. (No specimens.)

*To all whom it may concern:*

Be it known that I, ALVAH H. SABIN, of Burlington, in the State of Vermont, have invented a certain new and useful Improvement in Condensed Milk, of which the following is a specification.

What is known as "condensed milk" may be classed under two heads—that which is made under the Borden and similar processes, consisting of milk, which, without the addition of other ingredients, is evaporated *in vacuo* until it reaches the desired degree of concentration, and that which, whether evaporated in the open pan or *in vacuo*, has added to it, among other things, sugar. The first-named product, which is plain condensed milk, is intended for speedy or immediate use, and is apt to spoil or change condition if kept for a long time. The second product is a condensed milk which will keep, owing to the preservative qualities of the sugar added to it.

My invention relates to product of the last-named kind. In the manufacture of said product it has heretofore been customary to use either cane-sugar or glucose or grape-sugar as the preservative agent. There are several objections to the use of this agent. One is that it is liable to ferment, and that fermentation when it takes place seriously impairs the quality of the condensed milk and unfits it in many cases for use. Another is that the condensed milk is thereby rendered unnaturally sweet to such an extent as to be unpalatable to many persons.

I have found that these objections can be removed to a great extent, if not entirely, by employing lactose or milk-sugar as the preservative agent and dispensing entirely with either cane or grape sugar. The advantages possessed in this connection by lactose over the other sugars named are many. It is very much less likely than cane or grape sugar to ferment, and in case it does ferment it normally undergoes the lactic instead of the alcoholic or acetic fermentation which cane and grape sugar pass through, and while lactic acid is not regarded as particularly objectionable, the other acids named are. Moreover, lactose is more easily digested than other sugars, and consequently condensed milk made with lactose is more desirable than if made with cane or grape sugar. Again, inasmuch as lactose is less apt to ferment, its preservative power is practically greater, and hence a less amount in the milk need be used, and this in connection with the fact that lactose is much less sweet that cane-sugar, results in the obtainment of a condensed milk which is not nearly so sweet as the ordinary artificially-sweetened condensed milks heretofore made. In fine, by my invention I obtain a condensed milk of the kind hereinbefore named, which, while it will keep equally as well as if not better than other condensed milks of a like class heretofore made, contains no ingredient other than those which are to be found in milk itself.

In carrying out my invention the condensed milk may be made in the customary way by evaporation either in the open pan or *in vacuo* until the desired degree of concentration has been reached. I add to the milk, preferably before the evaporating operation has begun, lactose or milk-sugar in suitable proportions. I find that excellent results can be obtained by mixing them in the proportion, by weight, of one part of milk-sugar to seven parts of milk. I do not wish to be understood, however, as restricting myself to these proportions. They are arbitrary and can be widely varied at will.

The lactose which I now prefer in practice to use is that made by the process described in my Letters Patent No. 307,594; but I can of course use milk-sugar produced in other ways.

Having described my improvement and the best way known to me of carrying the same into effect, what I claim as new and of my own invention is—

The hereinbefore-described condensed milk resulting from the combination of condensed milk and lactose or milk-sugar, substantially as set forth.

In testimony whereof I have hereunto set my hand this 16th day of February, 1885.

ALVAH H. SABIN.

Witnesses:
 WM. C. STACY,
 M. C. SEYMOUR.